(12) United States Patent
Zhou et al.

(10) Patent No.: US 10,187,819 B2
(45) Date of Patent: Jan. 22, 2019

(54) ACCESS NETWORK CONGESTION CONTROL METHOD, BASE STATION DEVICE, AND POLICY AND CHARGING RULES FUNCTION NETWORK ELEMENT

(71) Applicant: Huawei Technologies Co., Ltd., Shenzhen, Guangdong (CN)

(72) Inventors: Lei Zhou, Shenzhen (CN); Yuqun Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 15/458,763

(22) Filed: Mar. 14, 2017

(65) Prior Publication Data

US 2017/0188260 A1    Jun. 29, 2017

Related U.S. Application Data

(63) Continuation of application No. PCT/CN2015/075773, filed on Apr. 2, 2015.

(30) Foreign Application Priority Data

Oct. 31, 2014    (CN) .......................... 2014 1 0605504

(51) Int. Cl.
*H04W 28/02*    (2009.01)
*H04L 12/14*    (2006.01)
(Continued)

(52) U.S. Cl.
CPC ..... *H04W 28/0289* (2013.01); *H04L 12/1407* (2013.01); *H04W 28/02* (2013.01); *H04W 72/0453* (2013.01); *H04W 88/02* (2013.01)

(58) Field of Classification Search
None
See application file for complete search history.

(56) References Cited

U.S. PATENT DOCUMENTS

2010/0067383 A1    3/2010   Nagy et al.
2011/0158090 A1    6/2011   Riley et al.
(Continued)

FOREIGN PATENT DOCUMENTS

CN    1518279 A       8/2004
CN    101711041 A     5/2010
(Continued)

OTHER PUBLICATIONS

SA WG2; "Presentation of 23.705 version 1.0.0: Study on system enhancements for user plane congestion management (Release 13)"; 3GPP TSG SA Meeting #65; SP-140432; Edinburgh, Scotland, UK; Sep. 15-17, 2014; 62 pages.
(Continued)

*Primary Examiner* — Jamaal R Henson

(57) ABSTRACT

An access network congestion control method, a base station device, and a policy and charging rules function network element are provided. The method includes the following steps: sending a congestion report to a policy and charging rules function network element (PCRF); receiving a radio frequency resource adjustment policy sent by the PCRF; and performing the radio frequency resource adjustment policy for the user equipment in the congested state and the user equipment in the over-served state. A corresponding base station device and PCRF are further disclosed. According to embodiments of the present application, when congestion occurs in a radio access network, radio frequency resources that are of user equipment in a congested state and that are of user equipment in an over-served state may be reallocated to ensure smooth communication.

12 Claims, 8 Drawing Sheets

(51) Int. Cl.
*H04W 72/04* (2009.01)
*H04W 88/02* (2009.01)

(56) References Cited

U.S. PATENT DOCUMENTS

| | | | |
|---|---|---|---|
| 2011/0205899 A1 | 8/2011 | Hosein | |
| 2012/0026910 A1 | 2/2012 | Ko et al. | |
| 2012/0213072 A1 | 8/2012 | Kotecha et al. | |
| 2012/0257499 A1* | 10/2012 | Chatterjee | H04W 28/0284 370/232 |
| 2013/0223222 A1 | 8/2013 | Kotecha et al. | |
| 2014/0011512 A1 | 1/2014 | Hu et al. | |
| 2014/0078897 A1 | 3/2014 | Hatakeyama et al. | |
| 2014/0086052 A1 | 3/2014 | Cai et al. | |
| 2014/0254367 A1 | 9/2014 | Jeong et al. | |
| 2014/0301204 A1* | 10/2014 | Koshimizu | H04W 28/0247 370/235 |
| 2014/0314080 A1 | 10/2014 | Park et al. | |
| 2014/0321271 A1 | 10/2014 | Bonnier et al. | |
| 2015/0009826 A1* | 1/2015 | Ma | H04W 28/0268 370/235 |

FOREIGN PATENT DOCUMENTS

| | | |
|---|---|---|
| CN | 102075898 A | 5/2011 |
| CN | 102138301 A | 7/2011 |
| CN | 102387546 A | 3/2012 |
| CN | 104053182 A | 9/2014 |
| CN | 104066115 A | 9/2014 |
| CN | 104105131 A | 10/2014 |
| CN | 104320808 A | 1/2015 |
| EP | 2385721 A1 | 11/2011 |
| EP | 2784991 A1 | 10/2014 |
| JP | 2003052069 A | 2/2003 |
| JP | 2014195252 A | 10/2014 |
| KR | 20120038243 A | 4/2012 |
| WO | 2014076094 A1 | 5/2014 |

OTHER PUBLICATIONS

Alcatel-Lucent et al.;"Analysis and Proposal for the RAN Based/ Packet Marking Solution"; SA WG2 Meeting #104; S2-142401; Dublin, Ireland; Jul. 7-11, 2014; 8 pages.

Ericsson; "Analysis and Proposal for Packet Marking Solution"; SA WG2 Meeting #104; S2-142360; Dublin, Ireland; Jul. 7-11, 2014; 10 pages.

"Reply LS on Questions to RAN on UPCON"; SA WG2 Meeting #S2-102; S2-140866; Malta; Mar. 24-28, 2014; 2 pages.

"3rd Generation Partnership Project; Technical Specification Group Services and System Aspects; Policy and Charging Control Architecture (Release 13)"; 3GPP TS 23.203 V13.1.0; Sep. 2014; 233 pages.

3rd Generation Partnership Project; Technical Specification Group Services and System Aspects; Feasibility Study on User Plane Congestion Management (Release 12); 3GPP TR 22.805 V12.1.0; Dec. 2012; 36 pages.

* cited by examiner

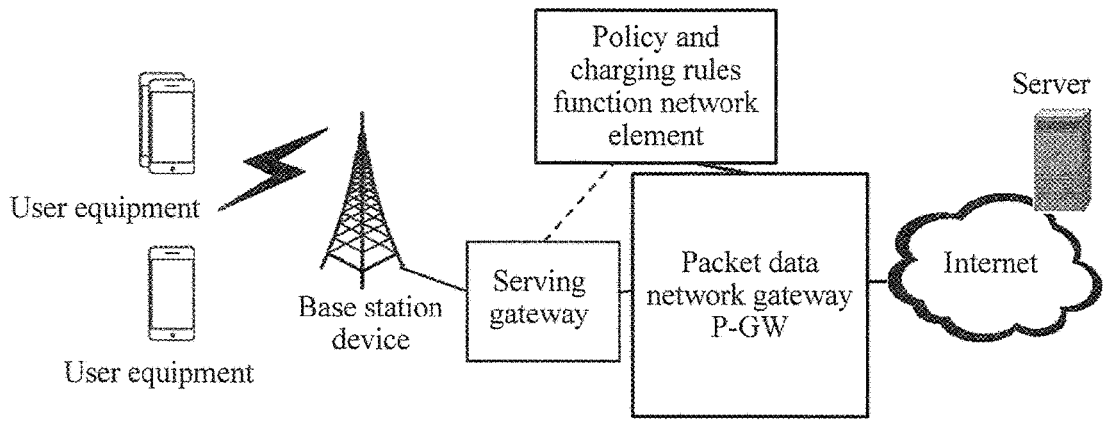

FIG. 1

```
Send a congestion report to a policy and charging rules function
network element PCRF, where the congestion report includes
information about user equipment in a congested state in at
least one user equipment, information about user equipment in      S101
an over-served state in at least one user equipment, and
information about radio frequency resources occupied by the
user equipment in the congested state and the user equipment in
the over-served state
                              ↓
Receive a radio frequency resource adjustment                       S102
           policy sent by the PCRF
                              ↓
Perform the radio frequency resource adjustment policy for          S103
the user equipment in the congested state and the user
       equipment in the over-served state
```

FIG. 2a

ACCESS NETWORK CONGESTION CONTROL METHOD, BASE STATION DEVICE, AND POLICY AND CHARGING RULES FUNCTION NETWORK ELEMENT

CROSS-REFERENCE TO RELATED APPLICATIONS

This application is a continuation of International Application No. PCT/CN2015/075773, filed on Apr. 2, 2015, which claims the priority to Chinese Patent Application No. 201410605504.6, filed on Oct. 31, 2014. The disclosures of the aforementioned applications are hereby incorporated by reference in their entireties.

TECHNICAL FIELD

The present application relates to the field of communications technologies, and in particular, to an access network congestion control method, a base station device, and a policy and charging rules function network element.

BACKGROUND

Wireless communication is widely used all over the world and greatly facilitates communication between people. The wireless communication can provide various services, including voice conversation, web page download, and the like. A typical wireless communications system or network such as a Long Term Evolution (LTE) system provides a radio link for multiple user equipment (UE) in a cellular cell by using a base station device to implement wireless communication. A shared radio spectrum is generally used in this wireless connection. As shown in FIG. 1, FIG. 1 is a schematic diagram of a wireless communications system. A base station device provides a wireless data communication service for multiple UEs (two UEs given in the figure) by using a same radio frequency band. Data downloaded by a UE from a server reaches the base station device through the Internet, a packet data network gateway (P-GW), and a serving gateway (S-GW), and is transmitted by the base station device to the UEs. Different from a conventional second-generation wireless communications system such as a Global System for Mobile Communications (GSM), the LTE system supports only a packet switching (PS) connection, and does not support a circuit switching (CS) connection any more. The CS connection requires resource reservation to ensure data transmission. Even if a transmit end does not have data that needs to be transmitted, a reserved resource cannot be released. The PS connection does not require resource reservation, and therefore can improve utilization efficiency of a radio spectrum. To provide different quality of service (QoS), the LTE system maps different services to different tunnels, so as to implement different processing. Nine different QoS characteristics are defined in the LTE. A guaranteed bit rate (GBR) service corresponding to a QoS class identifier (QCI) that is equal to 1-4 can provide a minimum rate guarantee. For example, a conventional voice service can provide a guaranteed voice transmission rate. In this way, speech quality of two parties of a call can be ensured and meaning expression of the call cannot be misunderstood. A non-GBR service (for example, QCI is equal to 6-9) does not provide the minimum rate guarantee. Therefore, in actual system running, a rate of the non-GBR service may be excessively low, causing poor user experience. For example, when a non-GBR type whose QCI=7 is used in a communication connection of a voice user, compared with a conventional voice of a GBR service whose QCI=1, in this case, a communication rate of both parties of a call may be much lower than an average rate that needs to be guaranteed in a normal call. Consequently, a recipient of the call may obviously feel a phenomenon such as a call delay and an unclear voice, and conversation experience is also relatively poor. A communication rate is lower than a required minimum rate and a service stream cannot be smoothly transmitted, and as a result congestion may occur in an access network.

In conclusion, a problem that needs to be resolved currently is how to control congestion in an access network to ensure smooth communication.

SUMMARY

Embodiments of the present application provide an access network congestion control method, a base station device, and a policy and charging rules function network element, so as to control congestion when the congestion occurs in an access network to ensure smooth communication.

According to a first aspect, an embodiment of the present application provides an access network congestion control method, including:

sending a congestion report to a policy and charging rules function network element (PCRF), where the congestion report includes information about user equipment in a congested state in at least one user equipment, information about user equipment in an over-served state in at least one user equipment, and information about radio frequency resources occupied by the user equipment in the congested state and the user equipment in the over-served state;

receiving a radio frequency resource adjustment policy sent by the PCRF; and performing the radio frequency resource adjustment policy for the user equipment in the congested state and the user equipment in the over-served state.

In a first possible implementation manner, before the sending a congestion report to the PCRF, the method further includes:

allocating, to the user equipment in the congested state according to the information about radio frequency resources occupied by the user equipment in the congested state and the user equipment in the over-served state and according to a specified algorithm, a part of the radio frequency resources of the user equipment in the over-served state that exceeds a corresponding limit; and correspondingly, the sending a congestion report to the PCRF includes:

sending a radio frequency resource pre-adjustment result as the congestion report to the PCRF, where the radio frequency resource pre-adjustment result includes information about user equipment still in the congested state and information about user equipment still in the over-served state after pre-adjustment, and information about radio frequency resources occupied by the user equipment still in the congested state and the user equipment still in the over-served state after pre-adjustment.

With reference to the first aspect, in a second possible implementation manner, the receiving a radio frequency resource adjustment policy sent by the PCRF includes:

receiving adjustment expectation result consultation request information sent by the PCRF, where the adjustment expectation result consultation request information includes the radio frequency resource adjustment policy; and the performing the radio frequency resource adjustment policy for the user equipment in the congested state and the user equipment in the over-served state includes:

performing expected adjustment for the radio frequency resource adjustment policy;

sending an expected adjustment result to the PCRF;

receiving a policy execution indication sent by the PCRF according to the expected adjustment result; and performing the radio frequency resource adjustment policy indicated by the policy execution indication for the user equipment in the congested state and the user equipment in the over-served state.

With reference to the first aspect, or the first possible implementation manner of the first aspect, or the second possible implementation manner of the first aspect, in a third possible implementation manner, the information about radio frequency resources occupied by the user equipment in the congested state and the user equipment in the over-served state is an average rate that is of the user equipment in the congested state and that is of the user equipment in the over-served state, or is represented by a congestion degree of the user equipment in the congested state and by an over-served degree of the user equipment in the over-served state; where the congestion degree=the average rate of the user equipment in the congested state/the minimum rate;

the over-served degree=the average rate of the user equipment in the over-served state/a limited rate; and the limited rate is determined from at least one limited rate according to a selection policy of the PCRF.

According to a second aspect, an embodiment of the present application provides an access network congestion control method, including:

receiving a congestion report sent by a base station device, where the congestion report includes information about user equipment in a congested state in at least one user equipment, information about user equipment in an over-served state in at least one user equipment, and information about radio frequency resources occupied by the user equipment in the congested state and the user equipment in the over-served state;

generating, according to the congestion report and a user service policy, a policy of performing radio frequency resource adjustment on the user equipment in the congested state and the user equipment in the over-served state; and sending the radio frequency resource adjustment policy to the base station device.

In a first possible implementation manner, the radio frequency resource adjustment policy is used to instruct the base station device to allocate a part of the radio frequency resources of the user equipment in the over-served state that exceeds a corresponding limit to the user equipment in the congested state, or stop transmitting a service stream of user equipment with a lowest priority in the user equipment in the congested state.

According to a third aspect, an embodiment of the present application provides a base station device, including:

a first sending unit, configured to send a congestion report to a policy and charging rules function network element (PCRF), where the congestion report includes information about user equipment in a congested state in at least one user equipment, information about user equipment in an over-served state in at least one user equipment, and information about radio frequency resources occupied by the user equipment in the congested state and the user equipment in the over-served state;

a first receiving unit, configured to receive a radio frequency resource adjustment policy sent by the PCRF; and a first execution unit, configured to perform the radio frequency resource adjustment policy for the user equipment in the congested state and the user equipment in the over-served state.

In a first possible implementation manner, the base station device further includes:

an allocation unit, configured to allocate, to the user equipment in the congested state according to the information about radio frequency resources occupied by the user equipment in the congested state and the user equipment in the over-served state and according to a specified algorithm, a part of the radio frequency resources of the user equipment in the over-served state that exceeds a corresponding limit; and correspondingly, the first sending unit is specifically configured to:

send a radio frequency resource pre-adjustment result as the congestion report to the PCRF, where the radio frequency resource pre-adjustment result includes information about user equipment still in the congested state and information about user equipment still in the over-served state after pre-adjustment, and information about radio frequency resources occupied by the user equipment still in the congested state and the user equipment still in the over-served state after pre-adjustment.

With reference to the third aspect, in a second possible implementation manner, the first receiving unit is specifically configured to receive adjustment expectation result consultation request information sent by the PCRF, where the adjustment expectation result consultation request information includes the radio frequency resource adjustment policy; and the first execution unit includes:

a second execution unit, configured to perform expected adjustment for the radio frequency resource adjustment policy;

a second sending unit, configured to send an expected adjustment result to the PCRF; and a second receiving unit, configured to receive a policy execution indication sent by the PCRF according to the expected adjustment result; where the second execution unit is further configured to perform the radio frequency resource adjustment policy indicated by the policy execution indication for the user equipment in the congested state and the user equipment in the over-served state.

With reference to the third aspect, or the first possible implementation manner of the third aspect, or the second possible implementation manner of the third aspect, in a third possible implementation manner, the information about radio frequency resources occupied by the user equipment in the congested state and the user equipment in the over-served state is an average rate that is of the user equipment in the congested state and that is of the user equipment in the over-served state, or is represented by a congestion degree of the user equipment in the congested state and by an over-served degree of the user equipment in the over-served state; where the congestion degree=the average rate of the user equipment in the congested state/the minimum rate;

the over-served degree=the average rate of the user equipment in the over-served state/a limited rate; and the limited rate is determined from at least one limited rate according to a selection policy of the PCRF.

According to a fourth aspect, an embodiment of the present application provides a policy and charging rules function network element, including:

a receiving unit, configured to receive a congestion report sent by a base station device, where the congestion report includes information about user equipment in a congested state in at least one user equipment, information about user equipment in an over-served state in at least one user equipment, and information about radio frequency resources occupied by the user equipment in the congested state and the user equipment in the over-served state;

a generation unit, configured to generate, according to the congestion report and a user service policy, a policy of performing radio frequency resource adjustment on the user equipment in the congested state and the user equipment in the over-served state; and a sending unit, configured to send the radio frequency resource adjustment policy to the base station device.

In a first possible implementation manner, the radio frequency resource adjustment policy is used to instruct the base station device to allocate a part of the radio frequency resources of the user equipment in the over-served state that exceeds a corresponding limit to the user equipment in the congested state, or stop transmitting a service stream of user equipment with a lowest priority in the user equipment in the congested state.

It may be learned that according to the access network congestion control method, the base station device, and the policy and charging rules function network element provided in the embodiments of the present application, when congestion occurs in a radio access network, radio frequency resources that are of user equipment in a congested state and that are of user equipment in an over-served state may be reallocated to ensure smooth communication.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 1 is a schematic diagram of a wireless communications system;

FIG. 2a is a schematic flowchart of an access network congestion control method according to an embodiment of the present application;

FIG. 2b is a schematic flowchart of a further example of the access network congestion control method according to the embodiment shown in FIG. 2a;

FIG. 3b is a schematic flowchart of a further example of the access network congestion control method according to the embodiment shown in FIG. 3a;

FIG. 4b is a schematic flowchart of a further example of the access network congestion control method according to the embodiment shown in FIG. 4a;

DETAILED DESCRIPTION

Figure 2B:
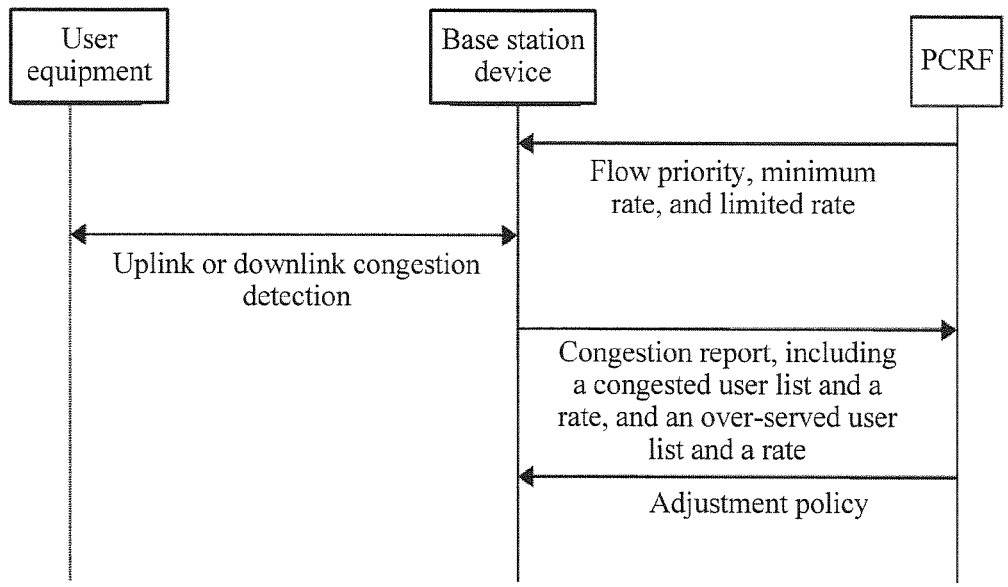

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Referring to FIG. 2a, FIG. 2a is a schematic flowchart of an access network congestion control method according to an embodiment of the present application. The method includes the following steps.

Step S101: Send a congestion report to a policy and charging rules function network element (PCRF), where the congestion report includes information about user equipment in a congested state in at least one user equipment, information about user equipment in an over-served state in at least one user equipment, and information about radio frequency resources occupied by the user equipment in the congested state and the user equipment in the over-served state.

Because multiple user equipment in a cell served by a base station device share an allocated segment of radio frequency resources, a situation in which radio frequency resources are unequally allocated to all user equipment is likely to occur. If user equipment transmits a service stream and minimum radio frequency resources needed by the user equipment cannot be met, congestion is likely to occur in an uplink/a downlink of an access network. That is, the user equipment cannot smoothly transmit data to the base station device, or the user equipment cannot smoothly receive data from the base station device.

Because allocated radio frequency resources of one base station device are fixed, some user equipment of the base station device become congested, that is, currently occupied radio frequency resources are less than the minimum radio frequency resources. In other words, these user equipment are in a congested state. Generally, radio frequency resources occupied by some other user equipment are more than actually needed radio frequency resources, or more than limited radio frequency resources specified by a system, that is, these user equipment are in an over-served state. The minimum radio frequency resources and the limited radio frequency resources may be specified by the PCRF. In this step, the congestion report of the base station device is sent to the PCRF, and the congestion report includes the information about the user equipment in the congested state, the information about the user equipment in the over-served state, and the information about radio frequency resources occupied by these user equipment. The PCRF receives the congestion report, and the PCRF serving as the policy and charging rules function network element has a specified user service policy for each user equipment of one base station device, such as a priority of user equipment, maximum radio frequency resources of each user equipment, or the like. The PCRF generates, according to the congestion report and the user service policy, a policy of performing radio frequency resource adjustment on the user equipment in the congested state and the user equipment in the over-served state, and sends the radio frequency resource adjustment policy to the base station device.

Step S102: Receive the radio frequency resource adjustment policy sent by the PCRF.

The base station device receives the radio frequency resource adjustment policy sent by the PCRF.

Step S103: Perform the radio frequency resource adjustment policy for the user equipment in the congested state and the user equipment in the over-served state.

The base station device receives the radio frequency resource adjustment policy sent by the PCRF, and performs the policy for the related user equipment in the congested state and user equipment in the over-served state. That is, a part of extra radio frequency resources of the user equipment in the over-served state is allocated to the user equipment in the congested state, so that the user equipment in the congested state may smoothly transmit a service stream, congestion of multiple user equipment served by the entire base station device is controlled, and service stream transmission of the user equipment in the over-served state is not obviously affected.

For a specific implementation process, refer to FIG. 2b. FIG. 2b is a schematic flowchart of a further example of the access network congestion control method according to the embodiment shown in FIG. 2a. In this example, a radio frequency resource is represented as an average rate because a level of the rate can basically represent a quantity of allocated radio frequency resources. According to the Shannon theorem, $C=B \times \log(1+S/N)$, where C is a communication rate or a throughput of user equipment, B is allocated radio frequency resources, and S/N is a signal-to-noise ratio. An existing wireless communications system already specifies that a base station and the user equipment need to measure an uplink channel condition and a downlink channel condition, that is, the signal-to-noise ratio S/N. Therefore, a situation of radio frequency resources allocated to the user equipment may be known according to the communication rate.

First, a PCRF needs to send different flow priorities to a base station device, to ensure a parameter such as a minimum rate (a basic rate, or the like) needed for service experience served by the flow and a limited rate that is set for the flow when necessary. The flow herein may be a service data flow such as a flow specified in a 3GPP protocol (for example, TS 23.203). A flow priority includes a priority class corresponding to a QCI, or a relative precedence class of multiple flows with a same QCI. The minimum rate and the limited rate may be specified by the PCRF in advance and be stored in the base station device, or may be sent with the flow priority by using signaling to the base station device.

After the base station device receives the foregoing parameter sent by the PCRF, whether congestion occurs in the flow is detected according to a value of the minimum rate. According to a discussion result of 3GPP SA2, in a period of time, if radio access network resources needed for user data transmission exceed a capacity actually provided by a radio access network, it may be considered that congestion occurs on a user plane of the radio access network. To avoid poor user service experience, the radio access network needs to ensure that user equipment transmits service data at a specified rate to avoid a phenomenon such as the foregoing call delay. This rate is a minimum rate transmitted by the PCRF to the base station device and needed for ensuring service experience served by a flow. If a transmission rate of the user equipment is less than the minimum rate in an actual service process, it may be determined that congestion occurs in the flow.

In an existing wireless communications system, for example, in an LTE, when a service of a non-GBR service of a PS connection is provided, because the system does not provide a rate guarantee like that of a GBR, when the base station device allocates the shared radio frequency resources to different user equipment in a cellular cell, allocation may be performed based on a fair principle such as a proportional fairness scheduling (PFS) algorithm a round-robin algorithm, and the like that are researched in many kinds of literature. A result scheduled by these algorithms is that frequency resources are relatively and fairly allocated between different UEs. For example, when a wireless communications system with a bandwidth of 10 MHz serves 10 UEs, frequency resources equally allocated to each UE are approximately 1 MHz. However, different geographical locations of UEs lead to different channel conditions of the UEs, that is, signal-to-noise ratios are different. Therefore, actual communication rates are also different. For example, in system emulation specified in 3GPP, when the PFS is used, it may be learned that in a cellular cell serving 19 UEs, a communication rate of each UE is shown in Table 1.

TABLE 1

Actually measured average rate of each UE in system emulation (unit: kbps)

| UE sequence number | 0 | 1 | 2 | 3 | 4 | 5 | 6 | 7 | 8 | 9 |
|---|---|---|---|---|---|---|---|---|---|---|
| Average rate | 606.8 | 1326.9 | 1137.1 | 350.5 | 738.3 | 1065.3 | 1422.1 | 1356.6 | 887.9 | 637.1 |

TABLE 1-continued

Actually measured average rate of each UE in system emulation (unit: kbps)

| UE sequence number | 10 | 11 | 12 | 13 | 14 | 15 | 16 | 17 | 18 |
|---|---|---|---|---|---|---|---|---|---|
| Average rate | 1053.1 | 1142.3 | 1752.1 | 1700.1 | 760.1 | 661.0 | 346.5 | 448.3 | 397.9 |

If all the 19 UEs transmit a media service and a minimum transmission rate required by media is 500 kbps, frame freezing certainly occurs in a video played on several UEs whose sequence numbers are respectively 3, 16, 17, and 18. On the contrary, two UEs whose sequence numbers are 12 and 13 even can smoothly play a streaming media program with a higher resolution on a mobile device (such as a tablet computer or a notebook computer) with a larger screen.

According to the foregoing congestion determining method, the base station device needs to report a congestion report to the PCRF. The congestion report includes: a list of congested user equipment, which are user equipment with sequence numbers of 3, 16, 17, and 18 in the foregoing system emulation example, and rates of the congested user equipment, that is, 350.5, 346.5, 448.3, and 397.9, whose unit is kbps; and a list of over-served user equipment and rates of the over-served user equipment. According to a selection policy determined by the PCRF, determining may be performed according to a limited rate in a method for determining over-served user equipment (or super-rate user equipment). For example, when the limited rate that is set by the PCRF is 1.4 Mbps, UEs whose sequence numbers are respectively 6, 12, and 13 are all over-served user equipment; or on a premise that the PCRF sets a separate limited rate for each UE, if a limited rate of UE 5 is 800 kbps and a limited rate of UE 7 is 1 Mbps, these two UEs are also over-served user equipment. According to the selection policy determined by the PCRF, the over-served user equipment may also be determined with reference to a flow priority. For example, when the limited rate that is set by the PCRF is 1.4 Mbps, if a flow priority of UE 1 is lower than a flow priority of another UE such as the UE 3, the UE 16, the UE 17, or the UE 18 that is in congestion by comparison, because a rate of the UE 1 is extremely close to 1.4 Mbps, the UE 1 may also be reported as an over-served user equipment. Alternatively, when none of the user equipment exceeds the limited rate, user equipment whose rate is closest to the limited rate may be selected and reported as an over-served user equipment, or the PCRF is requested for a new selection policy to determine the over-served user equipment.

An uplink average rate of UE measured by the base station device may be directly obtained from received data by means of statistics collection. A downlink average rate measured by the UE may be obtained by using a manner of a UE feedback result, or for a communications link of a radio link control (RLC) acknowledged mode (AM) manner, the downlink average rate may be obtained by means of calculation after an RLC transmit end of the base station device checks an amount of transmitted data for which an acknowledgment is received and subtracts redundant information such as signaling load in the transmitted data.

After the PCRF receives the congestion report of the base station device, according to service experience requirements of different user equipment, the PCRF adaptively adjusts a policy of each flow, and then sends the policy to the base station device for execution, so as to achieve a purpose of maximizing satisfaction of all user equipment in a cell. For example, for the foregoing cell of 19 UEs, the PCRF may send policy signaling to the base station device for explicitly requiring a rate limitation that the limited rate is 1.4 Mbps for the UE 6, the UE 12, and the UE 13. The priority of the UE 1 is relatively low and a limited rate of the UE 1 may further be reduced, so that a communication rate of a service data flow on the UE 1 does not exceed 1 Mbps. For the congested user equipment, the UE 3 and the UE 16 may be used as a first level, UE 18 may be used as a second level, and the UE 17 may be included in a third level in the policy signaling sent by the PCRF, thereby requiring the base station device to preferentially increase a rate that is of the UE 3 and that is of the UE 16. When radio resources are sufficient and the UE 3 and the UE 16 can implement a minimum rate of 500 kbps, experience of the UE 18 is improved and a rate of the UE 17 may not be adjusted. Alternatively, when a flow priority of the UE 3 is relatively low, the PCRF may require the base station device to first improve service experience of the UE 16, the UE17, and the UE 18. A transmission rate of the UE 3 is improved only when a minimum rate of a service data flow of these three UEs is met. Alternatively, when the radio resources are insufficient, the base station device may be required to stop a service for the UE 3 with the relatively low priority. It is first ensured that an effect of user satisfaction with the UE 16, the UE 17, and the UE 18 can be achieved. The base station device may also be required to equally allocate excessive radio frequency resources of the over-served user equipment to the UE 3, the UE 16, the UE 17, and the UE 18.

After the base station device receives the adjustment policy of the PCRF, there may be many methods for implementing a requirement of the PCRF. Limiting a communication rate of the over-served user equipment in the base station device may improve communication rates of all other user equipment. However, a congestion control effect is not good, because the congestion does not occur in many user equipment such as UE 0, UE 2, UE 4, UE 8, UE 9, UE 10, UE 11, UE 14, and UE 15. If the excessive radio frequency resources of the over-served user equipment are also allocated to these user equipment, an improvement effect for the congested user equipment such as the UE 16, the UE 17, and the UE 18 is significantly reduced. The base station device is responsible for allocating the radio frequency resources among all user equipment, and therefore the base station device may implement a directional adjustment of the excessive radio frequency resources of the over-served user equipment. For example, when the base station device uses the round-robin scheduling algorithm, a probability that resources are allocated to the congested user equipment may be appropriately improved, and a probability that resources are allocated to the over-served user equipment is simultaneously reduced. However, a probability that resources are allocated to other user equipment remains unchanged. Alternatively, the base station device uses a weighted proportional fairness scheduling (weighted PFS) method. A relatively small weighted value is imposed on UEs such as the UE 6, the UE 12, and the UE 13 whose rates need to be limited, so that frequency resources allocated to these UEs are reduced. In addition, a relatively large weighted value is imposed on UEs such as the UE 16, the UE 17, and the UE 18 whose rates need to be increased, so that frequency resources that can be allocated to these UEs are increased. A weighted value of other user equipment remains unchanged, thereby ensuring that service experience of the congested user equipment is satisfied as much as possible. In addition, the rate of the over-served user equipment can still reach or be close to a limited rate such as 1.4 Mbps. Therefore, service experience of these user equipment is not significantly reduced, and at the same time, communication of other user equipment is not affected. For example, when a user of the over-served user equipment watches a movie on a mobile phone screen, because the mobile phone screen is not large, human eyes generally cannot tell a difference when a resolution of a media program source is appropriately reduced. Therefore, user experience is not significantly reduced. However, a requirement for a transmission rate may be reduced. Alternatively, if the user downloads a file in a background, these users may not be unsatisfied if the transmission rate is reduced to some extent.

The foregoing method is applicable to uplink wireless communication or downlink wireless communication, and is also applicable to a situation in which multiple services are started in one user equipment, that is, there are multiple flows on one UE.

It may be learned that according to the access network congestion control method provided in this embodiment of the present application, when congestion occurs in a radio access network, radio frequency resources that are of user equipment in a congested state and that are of user equipment in an over-served state may be reallocated to ensure smooth communication.

Figure 3A:
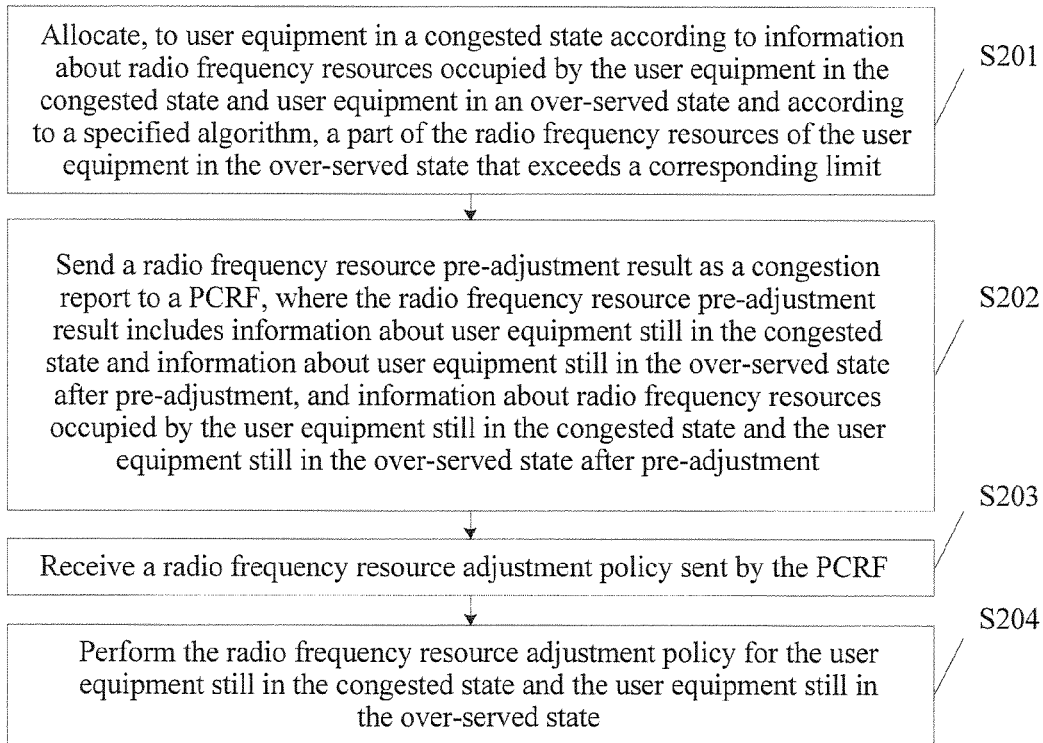
FIG. 3a is a schematic flowchart of another access network congestion control method according to an embodiment of the present application.

Referring to FIG. 3a, FIG. 3a is a schematic flowchart of another access network congestion control method according to an embodiment of the present application. The method includes the following steps.

Step S201: Allocate, to user equipment in a congested state according to information about radio frequency resources occupied by the user equipment in the congested state and user equipment in an over-served state and according to a specified algorithm, a part of the radio frequency resources of the user equipment in the over-served state that exceeds a corresponding limit.

After a base station device detects congestion, for example, an actually measured average rate of user equipment such as UE 3 in the foregoing system emulation example does not meet a minimum rate requirement, to improve user service experience, resources may be pre-adjusted in the user equipment in the congested state and the user equipment in the over-served state to self-mitigate congestion. The base station device performs the pre-adjustment, so that workload of a PCRF may be reduced and the congestion can be controlled in a timely manner. Specifically, the base station device allocates, to the user equipment in the congested state according to the information about the radio frequency resources occupied by the user equipment in the congested state and the user equipment in the over-served state and according to the specified algorithm, the part of the radio frequency resources of the user equipment in the over-served state that exceeds the corresponding limit. A specific algorithm is described in the foregoing embodiment.

Step S202: Send a radio frequency resource pre-adjustment result as a congestion report to the PCRF, where the radio frequency resource pre-adjustment result includes information about user equipment still in the congested state and information about user equipment still in the over-served state after pre-adjustment, and information about radio frequency resources occupied by the user equipment still in the congested state and the user equipment still in the over-served state after pre-adjustment.

After the base station device performs the foregoing pre-adjustment, it may be possible that the congestion cannot be completely controlled. The base station device needs to send the pre-adjustment result as the congestion report to the PCRF, so that the PCRF performs a further adjustment according to the pre-adjustment result and a user service policy to generate an adjustment policy and send the adjustment policy to the base station device.

Herein, the information about the radio frequency resources occupied by the user equipment in the congested state and the user equipment in the over-served state may be an average rate that is of the user equipment in the congested state and that is of the user equipment in the over-served state, or is represented by a congestion degree of the user equipment in the congested state and by an over-served degree of the user equipment in the over-served state; where the congestion degree=the average rate of the user equipment in the congested state/a minimum rate; and the over-served degree=the average rate of the user equipment in the over-served state/a limited rate.

The base station device determines the limited rate from at least one limited rate according to a selection policy of the PCRF. For a dynamic adaptive streaming service, the PCRF may obtain, from an application function (AF), multiple media rates such as a high-definition rate, a standard-definition rate, and a low-definition rate of same media content that are stored in a media server. These different rates may be sent to the base station device for providing identification of an over-served user equipment. When the user equipment in the over-served state is detected, the base station device may perform identification of different priorities for user equipment that transmits a DASH service stream, and preferentially report user equipment whose rate is higher than the high-definition media rate as the over-served user equipment.

Because a communication rate dynamic range of user equipment is relatively large, if a value of the average rate needs to be precisely notified, a signaling bit quantity that needs to be transmitted is relatively large. The signaling bit quantity reported by the base station device may be effectively reduced by defining the congestion degree and the over-served degree.

Step S203: Receive the radio frequency resource adjustment policy sent by the PCRF.

Step S204: Perform the radio frequency resource adjustment policy for user equipment still in the congested state and user equipment still in the over-served state.

After receiving the adjustment policy of the PCRF, the base station device performs a resource adjustment in the user equipment still in the congested state and the user equipment still in the over-served state after pre-adjustment to further control the congestion of the user equipment.

Figure 3B:
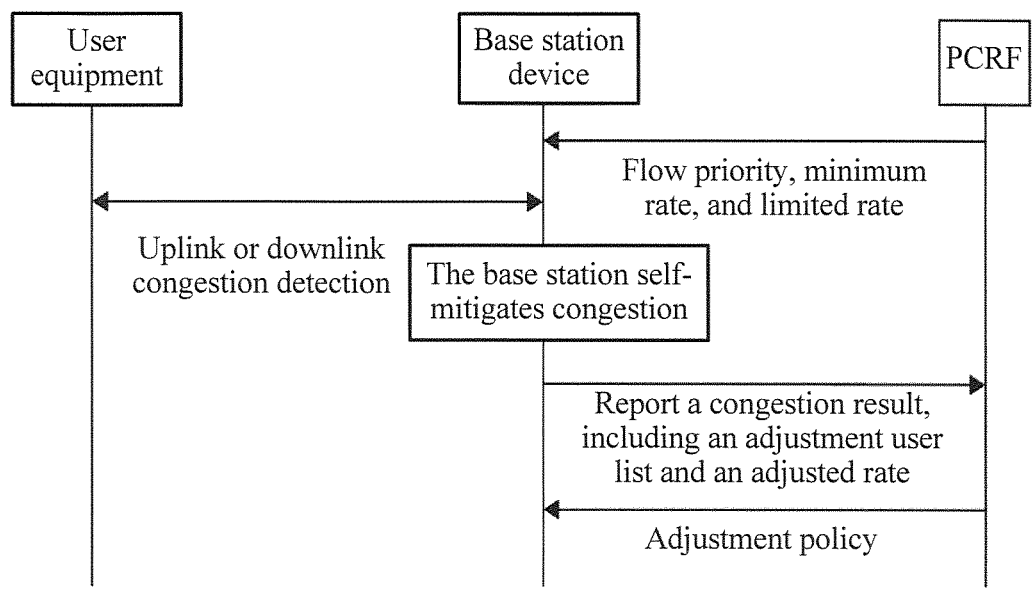

For a specific implementation process, refer to FIG. 3b. FIG. 3b is a schematic flowchart of a further example of the access network congestion control method according to the embodiment shown in FIG. 3a. A PCRF sends different flow priorities to a base station device, to ensure a parameter such as a minimum rate needed for service experience served by the flow and a limited rate that is set for the flow when necessary. After the base station device receives the foregoing parameter sent by the PCRF, whether congestion occurs in the flow is detected according to a value of the minimum rate.

After the base station device detects the congestion, for example, an actually measured average rate of user equipment such as UE 3 in the foregoing system emulation example does not meet a minimum rate requirement, to improve user service experience, the congestion may be self-mitigated. The base station device first detects whether the over-served user equipment such as UE 6, UE 12, or UE 13 exists. The base station device may first reduce a rate of the UE 6, the UE 12, and the UE 13 to a limited rate of 1.4 Mbps according to the foregoing rate adjustment method such as a weighted proportional fairness scheduling algorithm, and allocates frequency resources spared by these three UEs to the congested user equipment such as UE 3, UE 16, UE 17, and UE 18 by means of weighted adjustment. In this case, the congestion may be eliminated, or just may be mitigated. A transmission rate of a service data stream on some user equipment still does not reach the required minimum rate.

Next, the base station device needs to report an adjustment result to the PCRF. If the congestion is just mitigated and an average rate of some user equipment still does not reach a requirement, the base station device needs to report user equipment still in the congested state, user equipment still in the over-served state, and a current average rate that is of the user equipment still in the congested state and that is of the user equipment still in the over-served state.

After the PCRF receives the report of the base station device, the PCRF needs to perform a same method of the foregoing embodiment. For example, the base station device may be required to stop a service for the UE 3 with a relative low flow priority, and it is first ensured that an effect of user satisfaction with the UE 16, the UE 17, and the UE 18 can be achieved.

It may be learned that according to the access network congestion control method provided in this embodiment of the present application, when congestion occurs in a radio access network, radio frequency resources that are of user equipment in a congested state and that are of user equipment in an over-served state may be reallocated to ensure smooth communication. In addition, a base station device performs a pre-adjustment in resources when congestion occurs, so that the congestion may be controlled in a timely manner and workload of a PCRF is reduced.

Figure 4A:
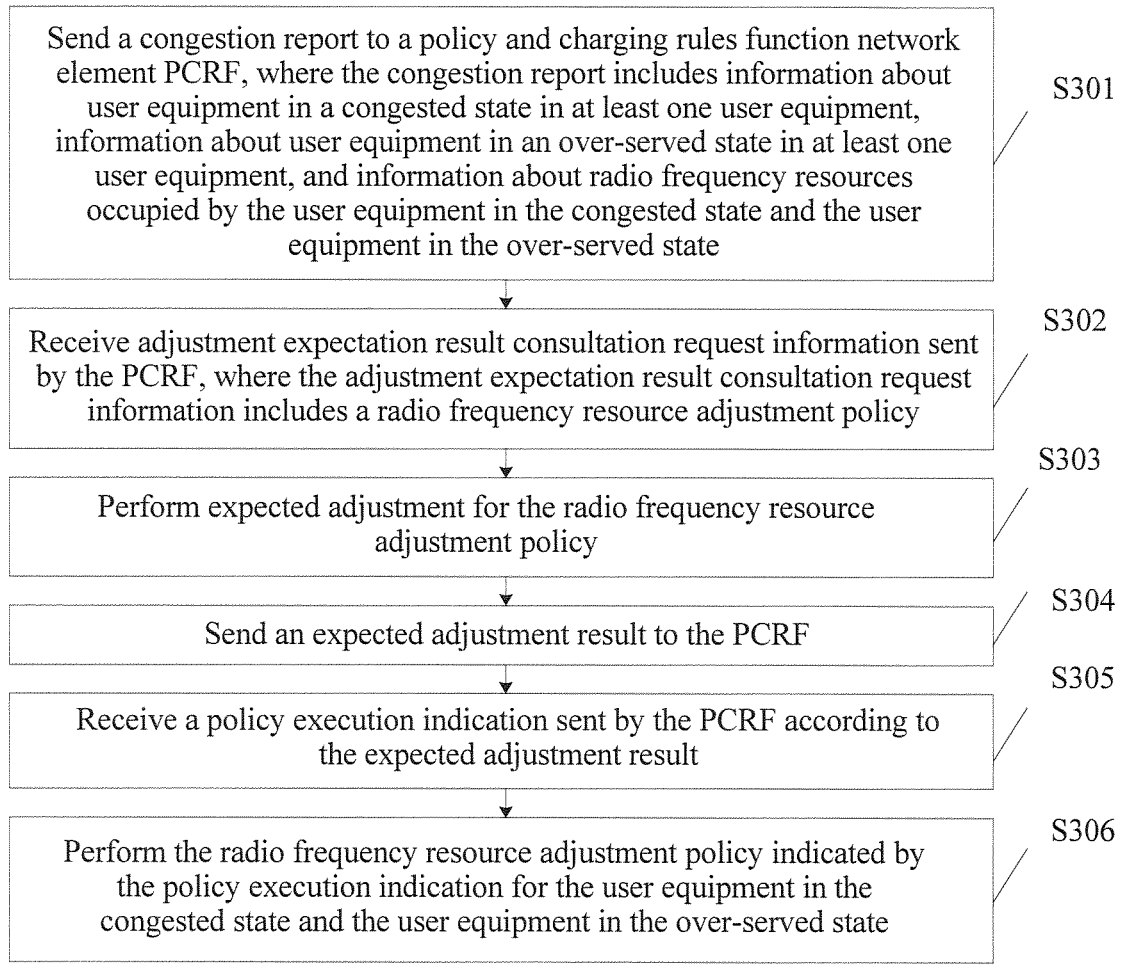
FIG. 4a is a schematic flowchart of still another access network congestion control method according to an embodiment of the present application.

Referring to FIG. 4a, FIG. 4a is a schematic flowchart of still another access network congestion control method according to an embodiment of the present application. The method includes the following steps.

Step S301: Send a congestion report to a policy and charging rules function network element (PCRF), where the congestion report includes information about user equipment in a congested state in at least one user equipment, information about user equipment in an over-served state in at least one user equipment, and information about radio frequency resources occupied by the user equipment in the congested state and the user equipment in the over-served state.

Step S301 is the same as step S101 of the embodiment shown in FIG. 2a, and details are not described herein.

Step S302: Receive adjustment expectation result consultation request information sent by the PCRF, where the adjustment expectation result consultation request information includes a radio frequency resource adjustment policy.

The base station device is responsible for managing allocation of radio frequency resources, and the PCRF station device predicts a result of a radio frequency resource adjustment less accurately than the base station device. To better ensure an effect of the radio frequency resource adjustment, the PCRF may send adjustment expectation result consultation request information to a base station. The adjustment expectation result consultation request information includes one or more radio frequency resource adjustment policies. The adjustment expectation result consultation request information specifically includes user equipment in which radio frequency resources need to be adjusted and reducing a quantity of radio frequency resources of the user equipment in the over-served state. For example, it is hoped that radio frequency resources allocated to the user equipment are reduced to 50% of the current radio frequency resources, and the base station device predicts a possible rate that is of the user equipment in the congested state and that is of the user equipment in the over-served state after the resources are transferred to the user equipment in the congested state. The adjustment expectation result consultation request information is used to instruct the base station device to execute, according to the one or more radio frequency resource adjustment policies, an expectation adjustment. The PCRF sends an adjustment expectation result consultation to the base station device to inquire about an expected effect that the base station device performs the radio frequency resource adjustment in the user equipment in the congested state and the user equipment in the over-served state.

Figure 4B:
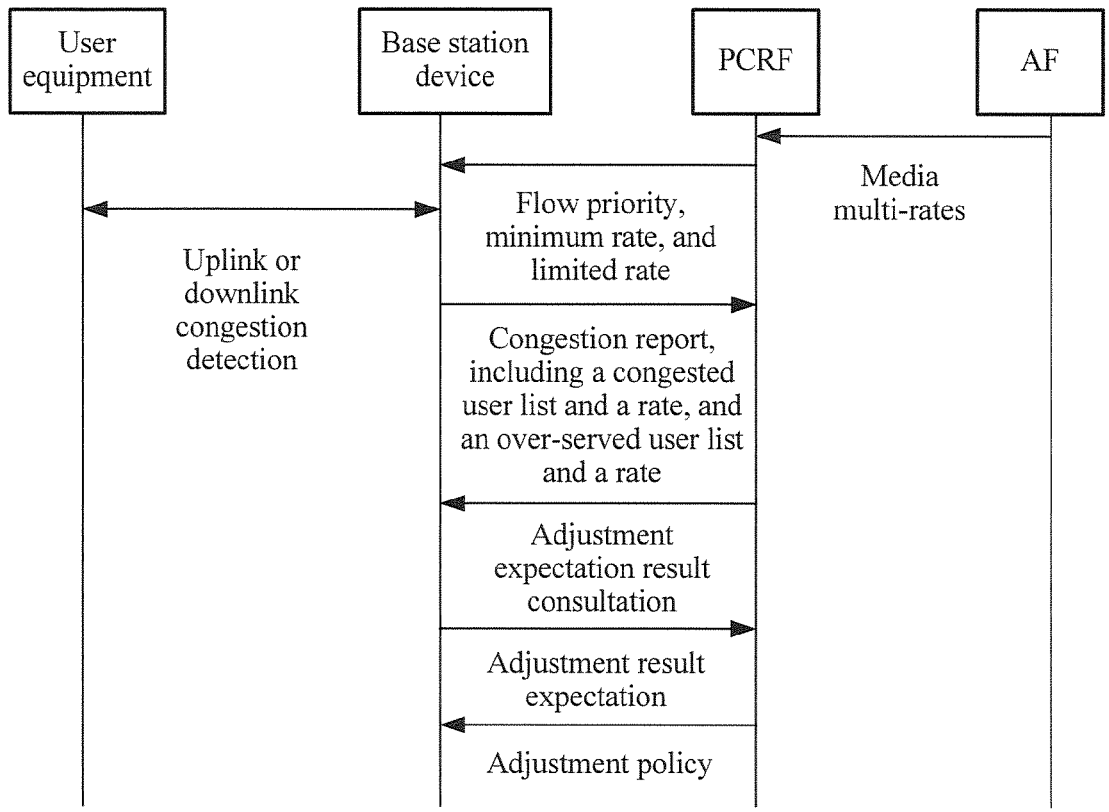

For a specific implementation process, refer to FIG. 4b. FIG. 4b is a schematic flowchart of a further example of the access network congestion control method according to the embodiment shown in FIG. 4a. For a DASH service, the PCRF may obtain, from an AF, multiple media rates such as a high-definition rate, a standard-definition rate, and a low-definition rate of same media content that are stored in a media server. These different rates may be sent to the base station device for providing identification of an over-served user equipment. When the user equipment in the over-served state is detected, the base station device may perform identification of different priorities for user equipment that transmits a DASH service stream, and preferentially report user equipment whose rate is higher than the high-definition media rate as the over-served user equipment.

For different limited rates or different user service policies, the PCRF may generate different radio frequency resource adjustment policies.

Step S303: Perform expected adjustment for the radio frequency resource adjustment policy.

Step S304: Send an expected adjustment result to the PCRF.

The base station device predicts a possible rate of each user equipment after the radio resource adjustment according to a scheduling algorithm used by the base station device and a current actual channel condition of user equipment that involves the radio frequency resource adjustment, and sends the possible rate to the PCRF. As shown in FIG. 4b, the base station device sends an expected adjustment result to the PCRF.

Step S305: Receive a policy execution indication sent by the PCRF according to the expected adjustment result.

The PCRF may perform some adjustments in the radio frequency resource adjustment policy according to the expected adjustment result sent by the base station device, or in step S302, there are multiple radio frequency resource adjustment policies sent by the PCRF to the base station device, and the PCRF sends the policy execution indication to instruct the base station device to perform a specific radio frequency resource adjustment policy.

Step S306: Perform the radio frequency resource adjustment policy indicated by the policy execution indication for the user equipment in the congested state and the user equipment in the over-served state.

The base station device performs the radio frequency resource adjustment policy indicated by the policy execution indication sent by the PCRF.

It may be learned that according to the access network congestion control method provided in this embodiment of the present application, when congestion occurs in a radio access network, radio frequency resources that are of user equipment in a congested state and that are of user equipment in an over-served state may be reallocated to ensure smooth communication. In addition, a base station device receives adjustment expectation result consultation request information of one or more radio frequency resource adjustment policies generated by a PCRF. An expected adjustment is performed in the radio frequency resource adjustment policy. The PCRF determines, according to a expected adjustment result, a radio frequency resource adjustment policy that is finally performed by the base station device, so that resource adjustment may be more accurate.

Figure 5:
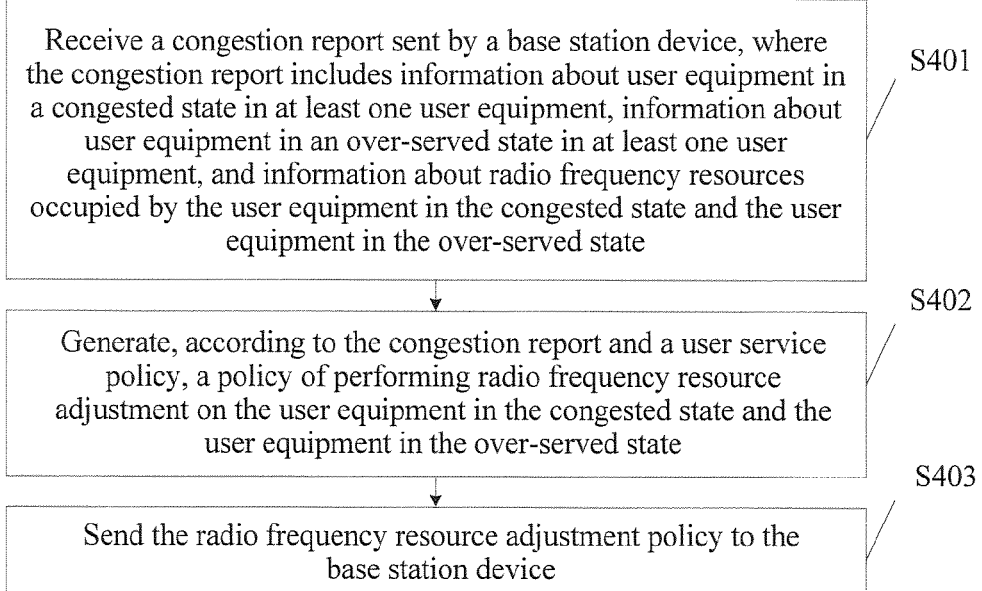
FIG. 5 is a schematic flowchart of still another access network congestion control method according to an embodiment of the present application.

Referring to FIG. 5, FIG. 5 is a schematic flowchart of still another access network congestion control method according to an embodiment of the present application. The method includes the following steps.

Step S401: Receive a congestion report sent by a base station device, where the congestion report includes information about user equipment in a congested state in at least one user equipment, information about user equipment in an over-served state in at least one user equipment, and information about radio frequency resources occupied by the user equipment in the congested state and the user equipment in the over-served state.

Because multiple user equipment served by the base station device share an allocated segment of radio frequency resources, a situation in which radio frequency resources are unequally allocated to all user equipment is likely to occur. If user equipment transmits a service stream and minimum radio frequency resources needed by the user equipment cannot be met, congestion is likely to occur in an uplink/a downlink of an access network. That is, the user equipment cannot smoothly transmit data to the base station device, or the user equipment cannot smoothly receive data from the base station device.

Because allocated radio frequency resources of one base station device are fixed, some user equipment of the base station device become congested, that is, currently occupied radio frequency resources are less than the minimum radio frequency resources. In other words, these user equipment are in a congested state. Generally, radio frequency resources occupied by some other user equipment are more than actually needed radio frequency resources, or more than limited radio frequency resources specified by a system, that is, these user equipment are in an over-served state. The minimum radio frequency resources and the limited radio frequency resources may be specified by the PCRF. The base station device sends the congestion report to the PCRF, and the congestion report includes the information about the user equipment in the congested state, the information about the user equipment in the over-served state, and the information about radio frequency resources occupied by the user equipment in the congested state and the user equipment in the over-served state.

Step S402: Generate, according to the congestion report and a user service policy, a policy of performing radio frequency resource adjustment on the user equipment in the congested state and the user equipment in the over-served state.

The PCRF receives the congestion report, and the PCRF serving as the policy and charging rules function network element has a specified user service policy for each user equipment of one base station device, such as a priority of user equipment, maximum radio frequency resources of each user equipment, or the like. The PCRF generates, according to the congestion report and the user service policy, the policy of performing the radio frequency resource adjustment in the user equipment in the congested state and the user equipment in the over-served state.

As an implementation manner, the radio frequency resource adjustment policy is used to instruct the base station device to allocate a part of the radio frequency resources occupied by the user equipment in the over-served state that exceeds a limit to the user equipment in the congested state in at least one user equipment, or stop transmitting at least one service stream of user equipment with a lowest priority in the user equipment in the congested state.

Step S403: Send the radio frequency resource adjustment policy to the base station device.

The PCRF sends the radio frequency resource adjustment policy to the base station device. The base station device receives the radio frequency resource adjustment policy sent by the PCRF, and performs the policy for the related user equipment in the congested state and user equipment in the over-served state. That is, a part of extra radio frequency resources of the user equipment in the over-served state is allocated to the user equipment in the congested state, so that the user equipment in the congested state may smoothly transmit a service stream, congestion of multiple user equipment served by the entire base station device is controlled, and service stream transmission of the user equipment in the over-served state is not obviously affected.

It may be learned that according to the access network congestion control method provided in this embodiment of the present application, when congestion occurs in a radio access network, radio frequency resources that are of user equipment in a congested state and that are of user equipment in an over-served state may be reallocated to ensure smooth communication.

Figure 6:
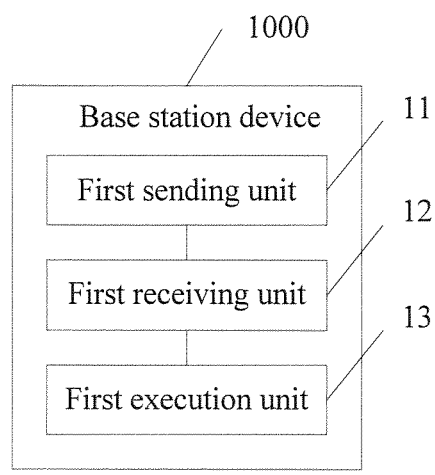
FIG. 6 is a schematic structural diagram of a base station device according to an embodiment of the present application.

Referring to FIG. 6, FIG. 6 is a schematic structural diagram of a base station device according to an embodiment of the present application. The base station device 1000 includes a first sending unit 11, a first receiving unit 12, and a first execution unit 13.

The first sending unit 11 is configured to send a congestion report to a policy and charging rules function network element PCRF, where the congestion report includes information about user equipment in a congested state in at least one user equipment, information about user equipment in an over-served state in at least one user equipment, and information about radio frequency resources occupied by the user equipment in the congested state and the user equipment in the over-served state.

Because multiple user equipment in a cell served by a base station device share an allocated segment of radio frequency resources, a situation in which radio frequency resources are unequally allocated to all user equipment is likely to occur. If user equipment transmits a service stream and minimum radio frequency resources needed by the user equipment cannot be met, congestion is likely to occur in an uplink/a downlink of an access network. That is, the user equipment cannot smoothly transmit data to the base station device, or the user equipment cannot smoothly receive data from the base station device.

Because allocated radio frequency resources of one base station device are fixed, some user equipment of the base station device become congested, that is, currently occupied radio frequency resources are less than the minimum radio frequency resources. In other words, these user equipment are in a congested state. Generally, radio frequency resources occupied by some other user equipment are more than actually needed radio frequency resources, or more than limited radio frequency resources specified by a system, that is, these user equipment are in an over-served state. The minimum radio frequency resources and the limited radio frequency resources may be specified by the PCRF. The first sending unit 11 sends the congestion report of the base station device to the PCRF, and the congestion report includes the information about the user equipment in the congested state, the information about the user equipment in the over-served state, and the information about radio frequency resources occupied by these user equipment. The PCRF receives the congestion report, and the PCRF serving as the policy and charging rules function network element has a specified user service policy for each user equipment of one base station device, such as a priority of user equipment, maximum radio frequency resources of each user equipment, or the like. The PCRF generates, according to the congestion report and the user service policy, a policy of performing radio frequency resource adjustment on the user equipment in the congested state and the user equipment in the over-served state, and sends the radio frequency resource adjustment policy to the base station device.

The first receiving unit 12 is configured to receive the radio frequency resource adjustment policy sent by the PCRF.

The first receiving unit 12 receives the radio frequency resource adjustment policy sent by the PCRF.

The first execution unit 13 is configured to perform the radio frequency resource adjustment policy for the user equipment in the congested state and the user equipment in the over-served state.

The first receiving unit 12 receives the radio frequency resource adjustment policy sent by the PCRF. The first execution unit 13 performs the policy for the related user equipment in the congested state and user equipment in the over-served state. That is, a part of extra radio frequency resources of the user equipment in the over-served state is allocated to the user equipment in the congested state, so that the user equipment in the congested state may smoothly transmit a service stream, congestion of multiple user equipment served by the entire base station device is controlled, and service stream transmission of the user equipment in the over-served state is not obviously affected.

It may be learned that according to the base station device provided in this embodiment of the present application, when congestion occurs in a radio access network, radio frequency resources that are of user equipment in a congested state and that are of user equipment in an over-served state may be reallocated to ensure smooth communication.

Figure 7:
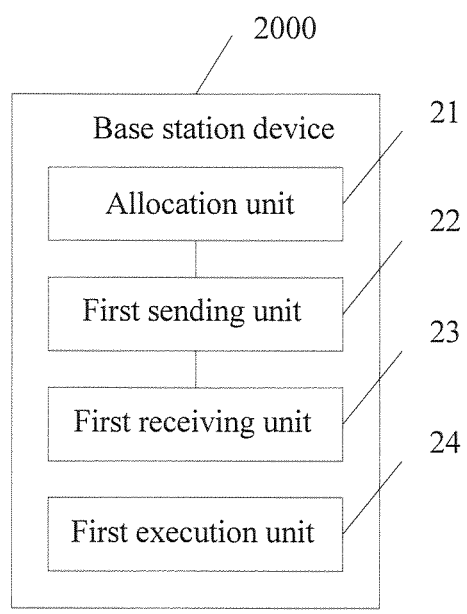
FIG. 7 is a schematic structural diagram of another base station device according to an embodiment of the present application.

Referring to FIG. 7, FIG. 7 is a schematic structural diagram of another base station device according to an embodiment of the present application. The base station device 2000 includes an allocation unit 21, a first sending unit 22, a first receiving unit 23, and a first execution unit 24.

The allocation unit 21 is configured to allocate, to user equipment in a congested state according to information about radio frequency resources occupied by the user equipment in the congested state and user equipment in an over-served state and according to a specified algorithm, a part of the radio frequency resources of the user equipment in the over-served state that exceeds a corresponding limit.

After a base station device detects congestion, for example, an actually measured average rate of user equipment such as UE 3 in the foregoing system emulation example does not meet a minimum rate requirement, to improve user service experience, resources may be pre-adjusted in the user equipment in the congested state and the user equipment in the over-served state to self-mitigate congestion. The base station device performs the pre-adjustment, so that workload of a PCRF may be reduced and the congestion can be controlled in a timely manner. Specifically, the allocation unit 21 allocates, to the user equipment in the congested state according to the information about the radio frequency resources occupied by the user equipment in the congested state and the user equipment in the over-served state and according to the specified algorithm, the part of the radio frequency resources of the user equipment in the over-served state that exceeds the corresponding limit.

The first sending unit 22 is configured to send a radio frequency resource pre-adjustment result as a congestion report to the PCRF, where the radio frequency resource pre-adjustment result includes information about user equipment still in the congested state and information about user equipment still in the over-served state after pre-adjustment, and information about radio frequency resources occupied by the user equipment still in the congested state and the user equipment still in the over-served state after pre-adjustment.

After the base station device performs the foregoing pre-adjustment, it may be possible that the congestion cannot be completely controlled. The first sending unit 22 needs to send the pre-adjustment result as the congestion report to the PCRF, so that the PCRF performs a further adjustment according to the pre-adjustment result and a user service policy to generate an adjustment policy and sends the adjustment policy to the base station device.

Herein, the information about the radio frequency resources occupied by the user equipment in the congested state and the user equipment in the over-served state may be an average rate that is of the user equipment in the congested state and that is of the user equipment in the over-served state, or is represented by a congestion degree of the user equipment in the congested state and by an over-served degree of the user equipment in the over-served state; where the congestion degree=the average rate of the user equipment in the congested state/a minimum rate; and the over-served degree=the average rate of the user equipment in the over-served state/a limited rate.

The base station device determines the limited rate from at least one limited rate according to a selection policy of the PCRF. For a dynamic adaptive streaming service, the PCRF may obtain, from an application function (AF), multiple media rates such as a high-definition rate, a standard-definition rate, and a low-definition rate of same media content that are stored in a media server. These different rates may be sent to the base station device for providing identification of an over-served user equipment. When the user equipment in the over-served state is detected, the base station device may perform identification of different priorities for user equipment that transmits a DASH service stream, and preferentially report user equipment whose rate is higher than the high-definition media rate as the over-served user equipment.

Because a communication rate dynamic range of user equipment is relatively large, if a value of the average rate needs to be precisely notified, a signaling bit quantity that needs to be transmitted is relatively large. The signaling bit quantity reported by the base station device may be effectively reduced by defining the congestion degree and the over-served degree.

The first receiving unit 23 is configured to receive the radio frequency resource adjustment policy sent by the PCRF.

The first execution unit 24 is configured to perform the radio frequency resource adjustment policy for the user equipment still in the congested state and the user equipment still in the over-served state.

After receiving the adjustment policy of the PCRF, the base station device performs a resource adjustment in the user equipment still in the congested state and the user equipment still in the over-served state after pre-adjustment to further control the congestion of the user equipment.

It may be learned that according to the base station device provided in this embodiment of the present application, when congestion occurs in a radio access network, radio frequency resources that are of user equipment in a congested state and that are of user equipment in an over-served state may be reallocated to ensure smooth communication. In addition, a base station device performs a pre-adjustment in resources when congestion occurs, so that the congestion may be controlled in a timely manner and workload of a PCRF is reduced.

Figure 8:
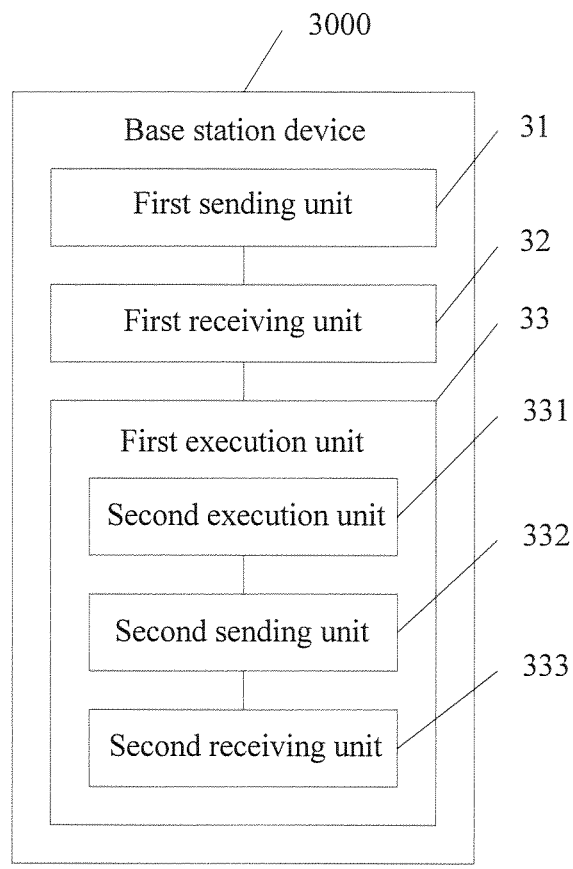
FIG. 8 is a schematic structural diagram of still another base station device according to an embodiment of the present application.

Referring to FIG. 8, FIG. 8 is a schematic structural diagram of still another base station device according to an embodiment of the present application. The base station device 3000 includes a first sending unit 31, a first receiving unit 32, and a first execution unit 33.

The first sending unit 31 is configured to send a congestion report to a policy and charging rules function network element PCRF, where the congestion report includes information about user equipment in a congested state in at least one user equipment, information about user equipment in an over-served state in at least one user equipment, and information about radio frequency resources occupied by the user equipment in the congested state and the user equipment in the over-served state.

A function of the first sending unit 31 is the same as a function of the first sending unit 11 of the embodiment shown in FIG. 6, and details are not described herein.

The first receiving unit 32 is configured to receive adjustment expectation result consultation request information sent by the PCRF, and the adjustment expectation result consultation request information includes the radio frequency resource adjustment policy.

The base station device is responsible for managing allocation of radio frequency resources, and the PCRF station device predicts a result of a radio frequency resource adjustment less accurately than the base station device. To better ensure an effect of the radio frequency resource adjustment, the PCRF may send adjustment expectation result consultation request information to a base station. The adjustment expectation result consultation request information includes one or more radio frequency resource adjustment policies. The adjustment expectation result consultation request information specifically includes user equipment in which radio frequency resources need to be adjusted and reducing a quantity of radio frequency resources of the user equipment in the over-served state. For example, it is hoped that radio frequency resources allocated to the user equipment are reduced to 50% of the current radio frequency resources, and the base station device predicts a possible rate that is of the user equipment in the congested state and that is of the user equipment in the over-served state after the resources are transferred to the user equipment in the congested state. The adjustment expectation result consultation request information is used to instruct the base station device to execute, according to the one or more radio frequency resource adjustment policies, an expectation adjustment. The PCRF sends an adjustment expectation result consultation to the base station device to inquire about an expected effect that the base station device performs the radio frequency resource adjustment in the user equipment in the congested state and the user equipment in the over-served state.

For a specific implementation process, refer to FIG. 4b. FIG. 4b is a schematic flowchart of a further example of the access network congestion control method according to the embodiment shown in FIG. 4a. For a DASH service, the PCRF may obtain, from an AF, multiple media rates such as a high-definition rate, a standard-definition rate, and a low-definition rate of same media content that are stored in a media server. These different rates may be sent to the base station device for providing identification of an over-served user equipment. When the user equipment in the over-served state is detected, the base station device may perform identification of different priorities for user equipment that transmits a DASH service stream, and preferentially report user equipment whose rate is higher than the high-definition media rate as the over-served user equipment.

For different limited rates or different user service policies, the PCRF may generate different radio frequency resource adjustment policies.

The first execution unit 33 is configured to perform the radio frequency resource adjustment policy for the user equipment in the congested state and the user equipment in the over-served state.

In this embodiment, the first execution unit 33 specifically includes a second execution unit 331, a second sending unit 332, and a second receiving unit 333.

The second execution unit 331 is configured to perform expected adjustment for the radio frequency resource adjustment policy.

The second sending unit 332 is configured to send an expected adjustment result to the PCRF.

The base station device predicts a possible rate of each user equipment after the radio resource adjustment according to a scheduling algorithm used by the base station device and a current actual channel condition of user equipment that involves the radio frequency resource adjustment, and sends the possible rate to the PCRF. As shown in FIG. 4b, the base station device sends an expected adjustment result to the PCRF.

The second receiving unit 333 is configured to receive a policy execution indication sent by the PCRF according to the expected adjustment result.

The PCRF may perform some adjustments in the radio frequency resource adjustment policy according to the expected adjustment result sent by the base station device, or there are multiple radio frequency resource adjustment policies sent by the PCRF to the base station device, and the PCRF sends the policy execution indication to instruct the base station device to perform a specific radio frequency resource adjustment policy.

The second execution unit 331 is further configured to perform the radio frequency resource adjustment policy indicated by the policy execution indication for the user equipment in the congested state and the user equipment in the over-served state.

The base station device performs the radio frequency resource adjustment policy indicated by the policy execution indication sent by the PCRF.

It may be learned that according to the base station device provided in this embodiment of the present application, when congestion occurs in a radio access network, radio frequency resources that are of user equipment in a congested state and that are of user equipment in an over-served state may be reallocated to ensure smooth communication. In addition, a base station device receives adjustment expectation result consultation request information of one or more radio frequency resource adjustment policies generated by a PCRF. An expected adjustment is performed in the radio frequency resource adjustment policy. The PCRF determines, according to a expected adjustment result, a radio frequency resource adjustment policy that is finally performed by the base station device, so that resource adjustment may be more accurate.

Figure 9:
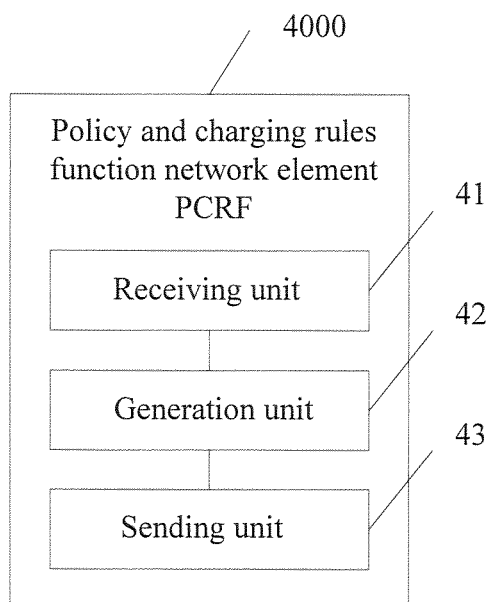
FIG. 9 is a schematic structural diagram of a policy and charging rules function network element PCRF according to an embodiment of the present application.

Referring to FIG. 9, FIG. 9 is a schematic structural diagram of a policy and charging rules function network element PCRF according to an embodiment of the present application. The PCRF 4000 includes a receiving unit 41, a generation unit 42, and a sending unit 43.

The receiving unit 41 is configured to receive a congestion report sent by a base station device, where the congestion report includes information about user equipment in a congested state in at least one user equipment, information about user equipment in an over-served state in at least one user equipment, and information about radio frequency resources occupied by the user equipment in the congested state and the user equipment in the over-served state.

Because multiple user equipment served by the base station device share an allocated segment of radio frequency resources, a situation in which radio frequency resources are unequally allocated to all user equipment is likely to occur. If user equipment transmits a service stream and minimum radio frequency resources needed by the user equipment cannot be met, congestion is likely to occur in an uplink/a downlink of an access network. That is, the user equipment cannot smoothly transmit data to the base station device, or the user equipment cannot smoothly receive data from the base station device.

Because allocated radio frequency resources of one base station device are fixed, some user equipment of the base station device become congested, that is, currently occupied radio frequency resources are less than the minimum radio frequency resources. In other words, these user equipment are in a congested state. Generally, radio frequency resources occupied by some other user equipment are more than actually needed radio frequency resources, or more than limited radio frequency resources specified by a system, that is, these user equipment are in an over-served state. The minimum radio frequency resources and the limited radio frequency resources may be specified by the PCRF. The base station device sends the congestion report to the PCRF, and the congestion report includes the information about the user equipment in the congested state, the info illation about the user equipment in the over-served state, and the information about radio frequency resources occupied by the user equipment in the congested state and the user equipment in the over-served state. The receiving unit 41 receives the congestion report sent by the base station device.

The generation unit 42 is configured to generate, according to the congestion report and a user service policy, a policy of performing radio frequency resource adjustment on the user equipment in the congested state and the user equipment in the over-served state.

The PCRF receives the congestion report, and the PCRF serving as the policy and charging rules function network element has a specified user service policy for each user equipment of one base station device, such as a priority of user equipment, maximum radio frequency resources of each user equipment, or the like. The generation unit 42 generates, according to the congestion report and the user service policy, the policy of performing the radio frequency resource adjustment in the user equipment in the congested state and the user equipment in the over-served state.

As an implementation manner, the radio frequency resource adjustment policy is used to instruct the base station device to allocate a part of the radio frequency resources occupied by the user equipment in the over-served state that exceeds a limit to the user equipment in the congested state in at least one user equipment, or stop transmitting at least one service stream of user equipment with a lowest priority in the user equipment in the congested state.

The sending unit 43 is configured to send the radio frequency resource adjustment policy to the base station device.

The sending unit 43 sends the radio frequency resource adjustment policy to the base station device. The base station device receives the radio frequency resource adjustment policy sent by the PCRF, and performs the policy for the related user equipment in the congested state and user equipment in the over-served state. That is, a part of extra radio frequency resources of the user equipment in the over-served state is allocated to the user equipment in the congested state, so that the user equipment in the congested state may smoothly transmit a service stream, congestion of multiple user equipment served by the entire base station device is controlled, and service stream transmission of the user equipment in the over-served state is not obviously affected.

It may be learned that according to the PCRF provided in this embodiment of the present application, when congestion occurs in a radio access network, radio frequency resources that are of user equipment in a congested state and that are of user equipment in an over-served state may be reallocated to ensure smooth communication.

Figure 10:
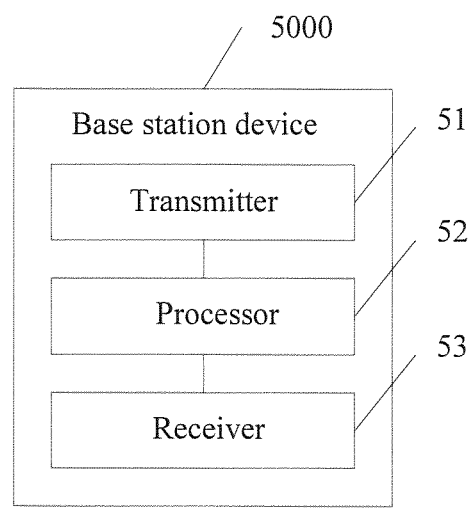
FIG. 10 is a schematic structural diagram of still another base station device according to an embodiment of the present application.

Referring to FIG. 10, FIG. 10 is a schematic structural diagram of still another base station device according to an embodiment of the present application. The base station device 5000 includes a transmitter 51, a processor 52, and a receiver 53.

The transmitter 51 is configured to send a congestion report to a policy and charging rules function network element PCRF, where the congestion report includes information about user equipment in a congested state in at least one user equipment, information about user equipment in an over-served state in at least one user equipment, and information about radio frequency resources occupied by the user equipment in the congested state and the user equipment in the over-served state.

The receiver 53 is configured to receive a radio frequency resource adjustment policy sent by the PCRF.

The processor 52 is configured to perform the radio frequency resource adjustment policy for the user equipment in the congested state and the user equipment in the over-served state.

As an implementation manner, before the transmitter 51 sends the congestion report to the PCRF, the processor 52 is further configured to:

allocate, to the user equipment in the congested state according to the information about radio frequency resources occupied by the user equipment in the congested state and the user equipment in the over-served state and according to a specified algorithm, a part of the radio frequency resources of the user equipment in the over-served state that exceeds a corresponding limit.

Correspondingly, the transmitter 51 is specifically configured to:

send a radio frequency resource pre-adjustment result as the congestion report to the PCRF, where the radio frequency resource pre-adjustment result includes information about user equipment still in the congested state and information about user equipment still in the over-served state after pre-adjustment, and information about radio frequency resources occupied by the user equipment still in the congested state and the user equipment still in the over-served state after pre-adjustment.

As another implementation manner, the receiver 53 is specifically configured to:

receive adjustment expectation result consultation request information sent by the PCRF, where the adjustment expectation result consultation request information includes the radio frequency resource adjustment policy.

That the processor 52 performs a step of performing the radio frequency resource adjustment policy for the user equipment in the congested state and the user equipment in the over-served state includes:

performing expected adjustment for the radio frequency resource adjustment policy;

sending an expected adjustment result to the PCRF;

receiving a policy execution indication sent by the PCRF according to the expected adjustment result; and performing the radio frequency resource adjustment policy indicated by the policy execution indication for the user equipment in the congested state and the user equipment in the over-served state.

The information about radio frequency resources occupied by the user equipment in the congested state and the user equipment in the over-served state is an average rate that is of the user equipment in the congested state and that is of the user equipment in the over-served state, or is represented by a congestion degree of the user equipment in the congested state and by an over-served degree of the user equipment in the over-served state; where the congestion degree=the average rate of the user equipment in the congested state/the minimum rate;

the over-served degree=the average rate of the user equipment in the over-served state/a limited rate; and the limited rate is determined from at least one limited rate according to a selection policy of the PCRF.

It may be learned that according to the base station device provided in this embodiment of the present application, when congestion occurs in a radio access network, radio frequency resources that are of user equipment in a congested state and that are of user equipment in an over-served state may be reallocated to ensure smooth communication.

Figure 11:
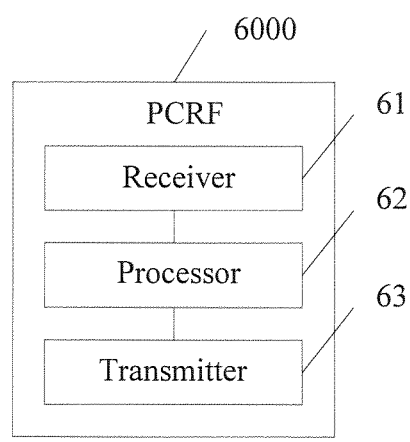
FIG. 11 is a schematic structural diagram of another PCRF according to an embodiment of the present application.

Referring to FIG. 11, FIG. 11 is a schematic structural diagram of another PCRF according to an embodiment of the present application. The PCRF 6000 includes a receiver 61, a processor 62, and a transmitter 63.

The receiver 61 is configured to receive a congestion report sent by a base station device, where the congestion report includes information about user equipment in a congested state in at least one user equipment, information about user equipment in an over-served state in at least one user equipment, and information about radio frequency resources occupied by the user equipment in the congested state and the user equipment in the over-served state.

The processor 62 is configured to generate, according to the congestion report and a user service policy, a policy of performing radio frequency resource adjustment on the user equipment in the congested state and the user equipment in the over-served state.

The transmitter 63 is configured to send the radio frequency resource adjustment policy to the base station device.

As an implementation manner, the radio frequency resource adjustment policy is used to instruct the base station device to allocate a part of the radio frequency resources of the user equipment in the over-served state that exceeds a corresponding limit to the user equipment in the congested state, or stop transmitting a service stream of user equipment with a lowest priority in the user equipment in the congested state.

It may be learned that according to the PCRF provided in this embodiment of the present application, when congestion occurs in a radio access network, radio frequency resources that are of user equipment in a congested state and that are of user equipment in an over-served state may be reallocated to ensure smooth communication.

It should be noted that, for brief description, the foregoing method embodiments are represented as a series of actions. However, a person skilled in the art should appreciate that the present application is not limited to the described order of the actions, because according to the present application, some steps may be performed in other orders or simultaneously. In addition, a person skilled in the art should also appreciate that all the embodiments described in the specification are examples of embodiments, and the related actions and modules are not necessarily mandatory to the present application.

In the foregoing embodiments, the description of each embodiment has respective focuses. For a part that is not described in detail in an embodiment, reference may be made to related descriptions in other embodiments.

With descriptions of the foregoing embodiments, a person skilled in the art may clearly understand that the present application may be implemented by hardware, firmware or a combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present application includes a compact disc CD, a laser disc, an optical disc, a digital versatile disc (DVD), a floppy disk and a blue-ray disc, where the disk generally copies data by a magnetic means, and the disc copies data optically by a laser means. The foregoing combination should also be included in the protection scope of the computer-readable medium.

In summary, what is described above is merely examples of embodiments of the technical solutions of the present application, but is not intended to limit the protection scope of the present application. Any modification, equivalent replacement, or improvement made without departing from the spirit and principle of the present application shall fall within the protection scope of the present application.

What is claimed is:

1. An access network congestion control method, comprising:
   sending a congestion report to a policy and charging rules function network element (PCRF), wherein the congestion report comprises information about user equipment in a congested state in at least one user equipment, information about user equipment in an over-served state in at least one user equipment, and information about radio frequency resources occupied by the user equipment in the congested state and the user equipment in the over-served state;
   receiving a radio frequency resource adjustment policy sent by the PCRF; and
   performing the radio frequency resource adjustment policy for the user equipment in the congested state and the user equipment in the over-served state.

2. The method according to claim 1, wherein:
   before sending a congestion report to the PCRF, the method further comprises:
      allocating, to the user equipment in the congested state according to the information about radio frequency resources occupied by the user equipment in the congested state and the user equipment in the over-served state and according to a specified algorithm, a part of the radio frequency resources of the user equipment in the over-served state that exceeds a corresponding limit; and
   correspondingly, sending a congestion report to the PCRF comprises:
      sending a radio frequency resource pre-adjustment result as the congestion report to the PCRF, wherein the radio frequency resource pre-adjustment result comprises information about user equipment still in the congested state and information about user equipment still in the over-served state after pre-adjustment, and information about radio frequency resources occupied by the user equipment still in the congested state and the user equipment still in the over-served state after pre-adjustment.

3. The method according to claim 1, wherein:
   receiving a radio frequency resource adjustment policy sent by the PCRF comprises:
      receiving adjustment expectation result consultation request information sent by the PCRF, wherein the adjustment expectation result consultation request information comprises the radio frequency resource adjustment policy; and
   performing the radio frequency resource adjustment policy for the user equipment in the congested state and the user equipment in the over-served state comprises:
      performing expected adjustment for the radio frequency resource adjustment policy,
      sending an expected adjustment result to the PCRF,
      receiving a policy execution indication sent by the PCRF according to the expected adjustment result, and
      performing the radio frequency resource adjustment policy indicated by the policy execution indication for the user equipment in the congested state and the user equipment in the over-served state.

4. The method according to claim 1, wherein the information about radio frequency resources occupied by the user equipment in the congested state and the user equipment in the over-served state is an average rate that is of the user equipment in the congested state and that is of the user equipment in the over-served state, or is represented by a congestion degree of the user equipment in the congested state and by an over-served degree of the user equipment in the over-served state, and wherein:
   the congestion degree=the average rate of the user equipment in the congested state/a minimum rate;
   the over-served degree=the average rate of the user equipment in the over-served state/a limited rate; and
   the limited rate is determined from at least one limited rate according to a selection policy of the PCRF.

5. An access network congestion control method, comprising:
   receiving a congestion report sent by a base station device, wherein the congestion report comprises information about user equipment in a congested state in at least one user equipment, information about user equipment in an over-served state in at least one user equipment, and information about radio frequency resources occupied by the user equipment in the congested state and the user equipment in the over-served state;
   generating, according to the congestion report and a user service policy, a policy of performing radio frequency resource adjustment on the user equipment in the congested state and the user equipment in the over-served state; and
   sending the radio frequency resource adjustment policy to the base station device.

6. The method according to claim 5, wherein the radio frequency resource adjustment policy is used to instruct the base station device to:
   allocate a part of the radio frequency resources of the user equipment in the over-served state that exceeds a corresponding limit to the user equipment in the congested state; or
   stop transmitting a service stream of user equipment with a lowest priority in the user equipment in the congested state.

7. A base station device, comprising:
   a transmitter, configured to send a congestion report to a policy and charging rules function network element (PCRF), wherein the congestion report comprises information about user equipment in a congested state in at least one user equipment, information about user equipment in an over-served state in at least one user equipment, and information about radio frequency resources occupied by the user equipment in the congested state and the user equipment in the over-served state;
a receiver, configured to receive a radio frequency resource adjustment policy sent by the PCRF; and
a processor, configured to perform the radio frequency resource adjustment policy for the user equipment in the congested state and the user equipment in the over-served state.

8. The base station device according to claim 7, the processor further
configured to allocate, to the user equipment in the congested state according to the information about radio frequency resources occupied by the user equipment in the congested state and the user equipment in the over-served state and according to a specified algorithm, a part of the radio frequency resources of the user equipment in the over-served state that exceeds a corresponding limit; and
correspondingly, the transmitter is configured to:
send a radio frequency resource pre-adjustment result as the congestion report to the PCRF, wherein the radio frequency resource pre-adjustment result comprises information about user equipment still in the congested state and information about user equipment still in the over-served state after pre-adjustment, and information about radio frequency resources occupied by the user equipment still in the congested state and the user equipment still in the over-served state after pre-adjustment.

9. The base station device according to claim 7, wherein:
the receiver is configured to receive adjustment expectation result consultation request information sent by the PCRF, wherein the adjustment expectation result consultation request information comprises the radio frequency resource adjustment policy; and
the processor is configured to:
perform expected adjustment for the radio frequency resource adjustment policy,
send an expected adjustment result to the PCRF,
receive a policy execution indication sent by the PCRF according to the expected adjustment result, and
perform the radio frequency resource adjustment policy indicated by the policy execution indication for the user equipment in the congested state and the user equipment in the over-served state.

10. The base station device according to claim 7, wherein the information about radio frequency resources occupied by the user equipment in the congested state and the user equipment in the over-served state is an average rate that is of the user equipment in the congested state and that is of the user equipment in the over-served state, or is represented by a congestion degree of the user equipment in the congested state and by an over-served degree of the user equipment in the over-served state, and wherein:
the congestion degree=the average rate of the user equipment in the congested state/a minimum rate;
the over-served degree=the average rate of the user equipment in the over-served state/a limited rate; and
the limited rate is determined from at least one limited rate according to a selection policy of the PCRF.

11. A policy and charging rules function network element (PCRF), comprising:
a receiver, configured to receive a congestion report sent by a base station device, wherein the congestion report comprises information about user equipment in a congested state in at least one user equipment, information about user equipment in an over-served state in at least one user equipment, and information about radio frequency resources occupied by the user equipment in the congested state and the user equipment in the over-served state;
a generation unit, configured to generate, according to the congestion report and a user service policy, a policy of performing radio frequency resource adjustment on the user equipment in the congested state and the user equipment in the over-served state; and
a sender, configured to send the radio frequency resource adjustment policy to the base station device.

12. The PCRF according to claim 11, wherein the radio frequency resource adjustment policy is used to instruct the base station device to:
allocate a part of the radio frequency resources of the user equipment in the over-served state that exceeds a corresponding limit to the user equipment in the congested state; or
stop transmitting a service stream of user equipment with a lowest priority in the user equipment in the congested state.

* * * * *